United States Patent [19]
Ley

[11] 3,733,719
[45] May 22, 1973

[54] TAPE RECORDER FOR TEACHING, PARTICULARLY FOR LANGUAGE TEACHING

[76] Inventor: Erich Josef Ley, Reutlinger Strasse 51, D-71 Heilbronn, Germany

[22] Filed: Mar. 31, 1971

[21] Appl. No.: 129,706

[30] Foreign Application Priority Data
Apr. 2, 1970 Germany.....................P 20 15 671.2

[52] U.S. Cl. ...35/35 C, 179/100.2 MD, 179/100.2 T
[51] Int. Cl. ..............................................G09b 5/04
[58] Field of Search ....................................35/35 C; 17/100.2 MD, 100.2 T

[56] References Cited
UNITED STATES PATENTS
3,491,462   1/1970   Ward....................................35/35 C

*Primary Examiner*—Wm. H. Grieb
*Attorney*—Robert E. Burns and Emmanuel J. Lobato

[57] ABSTRACT

Tape recorder for teaching utilizing a tape having a track for recordal of a student's voice. The recorder has spaced-apart recording and reproducing heads for the student's track. A tape guiding disc carries this reproducing head and is rotatable by the tape during recordal of the student's voice to increase the spacing between the recording and the reproducing heads. The disc can be automatically arrested on completion of a recording which is then immediately reproduced as the tape travels past the stationary reproducing head.

7 Claims, 1 Drawing Figure

PATENTED MAY 22 1973
3,733,719
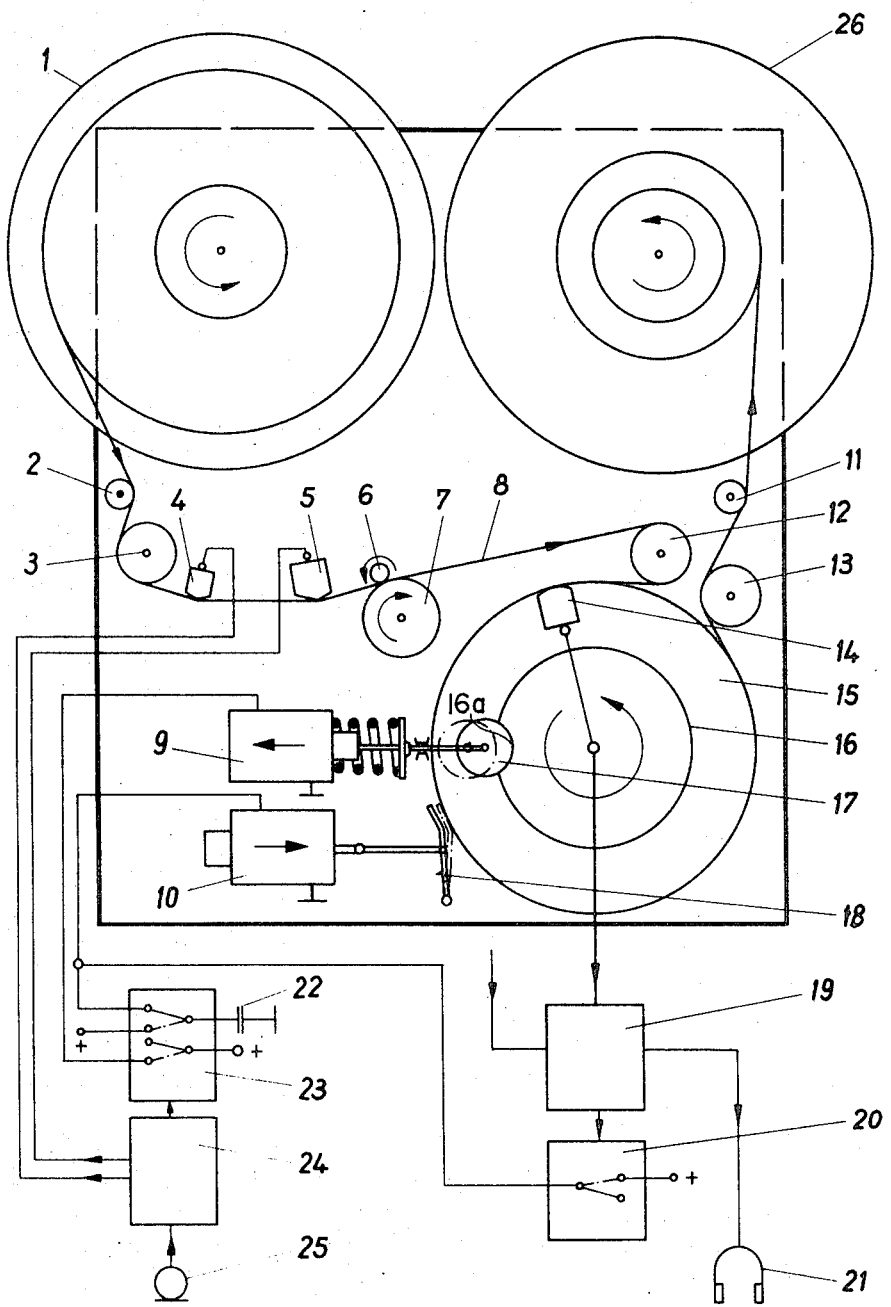

TAPE RECORDER FOR TEACHING, PARTICULARLY FOR LANGUAGE TEACHING

The invention relates to a tape recorder for teaching, particularly language teaching, with a recording head and a reproducing head for the student track and having means for matching the time delay between commencement of recording and commencement of reproducing of the oral exercise to the varying duration of the oral exercises.

In such a tape recorder the student has to repeat different length oral examples which are to be simultaneously recorded and the student should be able immediately to listen to this recording and compare it with the following identical oral example.

Previously proposed tape recorders which have heretofore been utilized in language teaching have the disadvantage that the student can only hear his oral performance and compare it with the oral example if he performs more or less complicated control operations and manipulations which inevitably distract his concentration from learning. Even the tape recorders having a tape loop require from the student a manual actuation and the teaching tapes must contain special information for the student if the length of the teaching text or the oral exercises alters and the guide roller consequently has to be displaced. Other known tape recorders which record the student's voice in reverse direction of travel of the tape either above or below the oral example of the teaching track of the tape recorder, have the great disadvantage that the student is obliged to listen to the oral example three times for each recording and reproducing of his oral exercise.

In tape recorders that have to be stopped and started the tape is accelerated from zero to the nominal speed at each time of starting. If this should happen when the erase head is switched in, or if the erase head is switched in before each recording, then acoustic disturbances are produced. These acoustic noises originate from the H.F. erase or premagnetizing current utilized in all tape recorders, whose frequency lies between 60 and 120 kilohertz. On starting or stopping of the recorder as also during speed variations of the tape, the erase or carrier frequency recorded on the tape passes the acoustic threshold. In studios and broadcasting concerns these disturbing noises are cut from the tapes but this cannot, of course, be done in teaching with continuous audio-comparative exercises. The magnitude and duration of this acoustic noise (which is inevitably recorded on the tape and is well known in tape recorder technology and is unavoidable at each variation or interruption of the travel of the tape in the recording position) is directly proportional to the stop/start time of the tape. Accordingly, in the known teaching tape recorders these acoustic disturbances are also recorded on the tape. They are a source of a considerable disturbance to the student and are thus undesirable for an intensive teaching operation requiring a high degree of concentration. A known recorder, which also has this defect, is adapted to match the interval between recording and reproducing of the student's oral exercise by means of a free tape loop between the drive shaft and the reproducing head. The tape thus continuously alters its path and its speed during the learning stage. Thus the tape causes, in addition to the electro-acoustic problems already mentioned, mechanical problems which can only be obviated with great technical difficulty. A free tape loop is not operationally reliable, particularly with horizontal travel of the tape. Until now no technical feasible solution for the housing of the loop and the avoidance of operational disturbances through such free loops has been found suitable for teaching tape recorders.

By means of the invention particularly those disadvantages mentioned above are to be avoided and the advantages set out below are to be achieved. The object of the invention is to provide a simple, reliable device for a teaching tape recorder, which makes it possible to listen to a text of varying length that has just been recorded without the travel of the tape having to be altered in its speed and direction. It is a further object of the invention that the student should be required to execute no operational controls whatever for recording and listening to the individual oral exercises. According to the invention there is provided that the reproducing head for the student track of the tape is provided on a rotatable and arrestable tape guiding disc which in the released condition is driven by the tape, and that, when the tape driving disc is arrested, the tape runs past the reproducing head for the student track.

The arrangement of the reproducing head for the student track on a rotatable and arrestable tape guiding disc permits the length of the path which the tape travels between recording and reproducing of the student track to be varied as desired in the context of the constructional arrangement without the tape departing from its predetermined path and having to be subject to a speed variation. By this means all the problems which occur with free loops are avoided and the disadvantageous displacement of a guide roller with a variably controlled constantly tensioned tape loop is obviated.

In spite of this, there is enabled with the simplest and operationally most reliable means, an exact matching of the length of the tape path between the recording head and the reproducing head for the student track to the duration of the oral exercise. During the running of the individual teaching and learning stages, namely (1) listening to the teaching text (the so called oral model), (2) repetition of the model or reply to a question with simultaneous recordal on the student track (3) reproduction of this oral exercise and possibly (4) repetition of the oral model, depending on the programme arrangement, the tape runs on a predetermined path and at constant speed. The electro-acoustic problems of the disturbing acoustic noises caused by switching on and off are thus obviated.

Apart from this the arrangement of the rotary disc makes possible a faultless automatic control with simple construction so that all operational control, by the student on recording and reproducing his exercises are avoided. For this purpose switch arrangements with amplifiers, timing elements, relays and electro-magnetic elements are provided which, shortly before the recording of the students oral exercise reaches the reproducing head, release the tape guiding disc so that this runs with the tape and which hold the tape guiding disc stationary from the end of the student's oral exercise until the end of the reproduction of the exercise and then allow the tape guiding disc to run with the tape up to a stop position in which the reproducing head for the student track is located in the starting position. Arrest or release of the tape guiding disc thus occurs automatically by recording or reproducing of the student's oral exercise in cooperation with appropriate amplifiers, timing elements, relays and electromechanical elements.

The invention will now be further described with reference to the accompanying drawing which is a schematic representation of one embodiment of a tape recorder in accordance with the invention.

Referring to the drawing, the tape 8 is adapted to be driven at constant speed in the direction of the arrow by means of a tape driving shaft 6 cooperating with a pressure roller 7 and by means of a take-up spool 26 driven by a motor (not shown). The tape 8 runs from a supply spool 1 over guide rollers 2 and 3, an erase head 4, and a recording head 5 of the student track to the tape driving shaft 6 with the pressure roller 7. From the pressure roller 7 it runs on round a guide roller 12, past a reproducing head 14 fixedly mounted on a tape guiding disc 15, around the tape guiding disc 15 and via guide rollers 13 and 11 to the tape take-up spool 26.

The oral example or the teaching text is presented to the student from the teaching track of the tape via a reproducing head (not shown), an amplifier 19 and headphones 21. The rotatable tape guiding disc 15 is initially held stationary by means of a solenoid 9 carrying a roller 17 which is spring biased into engagement with a cam track on the periphery of a cam plate 16 rotationally fast with the tape guiding disc 15 and having on its periphery a recess 16a in which the roller 17 is engageable. When the student repeats the teaching text he has heard, his oral performance is recorded on the student track of the tape 8 via a microphone 25, an amplifier 24 and the recording head 5. At the same time, via a further amplifier (not shown) cooperating with an adjustable timing element at the correct moment of time before the recording reaches the reproducing head 14, the contacts of the relay 23 are switched into the position illustrated in dotted line and the solenoid 9 is thus actuated in the direction of the arrow. The roller 17 is thus moved into the position shown in dotted line and the rotatable tape guiding disc 15 with the reproducing head 14 rotates in the direction of the arrow with a peripheral speed approximating to the tape speed.

When the student has finished speaking, the speech responsive relay 23 is switched off and the condenser 22, that has been charged in the interim period, is discharged to the solenoid 10 which is thereby caused to urge the braking lever 18 in the direction of the arrow into the position shown in dotted line, thus arresting the tape guiding disc 15 for a certain time. At the same time the solenoid 9 is deactivated and the roller 17 again engages the cam plate 16 since the distance along the tape from the recording head 5 to the reproducing head 14, and the diameter of the tape guiding disc 15, are so selected that with the longest student speech recording that is envisaged, the reproducing head 14 remains in the vicinity of the tape running around the tape guiding disc 15. The tape 8 now runs over the reproducing head 14 held stationary by the braking lever 18 and the student hears his recorded oral exercise by way of the amplifier 19 and the headphones 21. At the same time a relay 20, which is operatively connected with a timing element, is switched in so that the solenoid 10, acting through the braking lever 18, holds the tape guiding disc 15 stationary until reproduction of the student's oral exercise is completed whereupon the relay 20 switches off and the solenoid 10 moves the braking lever 18 to release the tape guiding disc 15. The tape guiding disc 15 is now driven again by the tape 8 until the roller 17 engages in the recess 16a of the cam disc 16 and the tape guiding disc 15 is again arrested. One stage of the exercise is thus completed and the next stage follows with a like sequence of operations.

It should be noted that the distance from the recording head 5 to the reproducing head 14 and the diameter of the tape guiding disc 15 can be so determined in a construction of a tape recorder that, depending upon application, predetermined exercise periods can be obtained. These established exercise periods can be varied by means of different tape speeds provided on the tape recorder.

It will be appreciated that the oral example or teaching text may be presented to the student otherwise than from a teaching track of the tape on which the student's voice is to be recorded, for example, over a radio, gramophone or other tape recorder.

What is claimed is:

1. Tape recorder for teaching utilizing a tape having a track for recording a student's voice, comprising a recording head, tape transport means including a rotatable tape guiding disc around the periphery of which the tape runs after passing said recording head, a reproducing head carried by said tape guiding disc in position to contact tape on said disc, means for initially holding said disc in selected position means for releasing said disc for rotation by the tape during recording of the student's voice and means for automatically arresting said tape guiding disc upon completion of such recording to permit travel of the tape past the reproducing head then held stationary, thereby to reproduce the recording.

2. Tape recorder according to claim 1, in which said holding means is operable to hold said tape guiding disc stationary during an initial portion of said recording of the student's voice and said releasing means is operative to release said disc just before the portion of the tape thus recorded reaches said reproducing head.

3. Tape recorder according to claim 1, in which said holding means comprises a cam plate fixed to said tape guiding disc for rotation therewith and having a cam track concentric with said disc except for a recess at a selected position, a roller engageable with said cam track and in said recess, and means for biasing said roller into engagement with said cam track.

4. Tape recorder according to claim 3, in which said releasing means comprises a solenoid for withdrawing said roller from said cam track and circuit means for energizing said solenoid.

5. Tape recorder according to claim 1, in which said arresting means comprises means for releasing said tape guiding disc upon completion of such reproduction to permit rotation of said disc by the tape to a starting position determined by said holding means.

6. Tape recorder according to claim 1, in which said arresting means comprises friction brake means acting on said tape guiding disc and means for actuating said brake means.

7. Tape recorder according to claim 6, in which said actuating means comprises a solenoid and circuit means controlling said solenoid.

* * * * *